Feb. 3, 1925.　　　　　　　　　　　　　　　　1,525,231
W. J. DEMMING
MACHINIST'S GAUGE
Filed April 18, 1922　　　　2 Sheets-Sheet 1

INVENTOR
William John Demming
By Bates & Macklin,
ATTORNEYS

Feb. 3, 1925.
W. J. DEMMING
MACHINIST'S GAUGE
Filed April 18, 1922
1,525,231
2 Sheets-Sheet 2
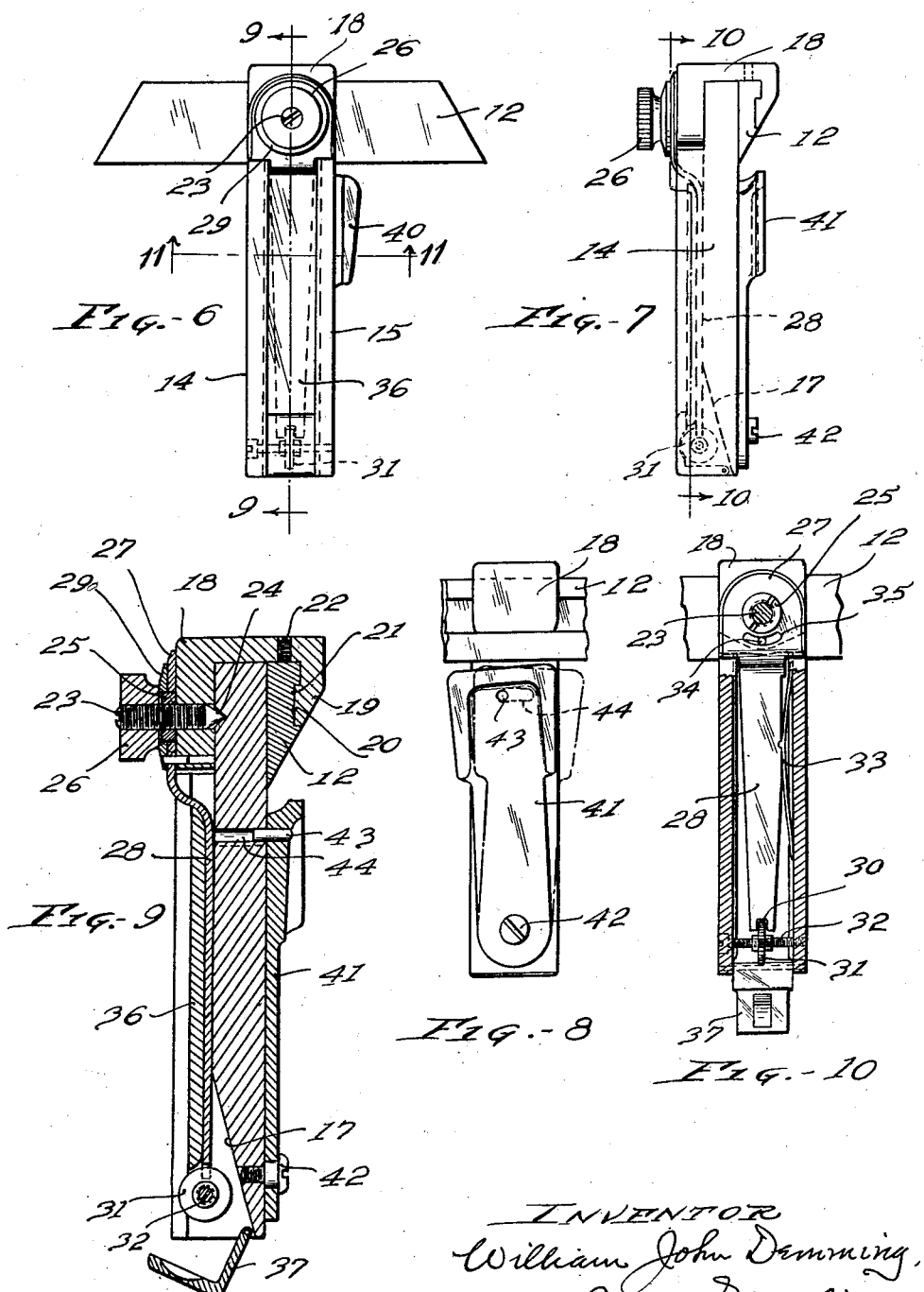

Patented Feb. 3, 1925.

1,525,231

UNITED STATES PATENT OFFICE.

WILLIAM JOHN DEMMING, OF CLEVELAND, OHIO.

MACHINIST'S GAUGE.

Application filed April 18, 1922. Serial No. 554,517.

*To all whom it may concern:*

Be it known that I, WILLIAM JOHN DEMMING, a citizen of the United States, residing at Cleveland, in the county of Cuyahoga and State of Ohio, have invented a certain new and useful Improvement in Machinists' Gauges, of which the following is a full, clear, and exact description, reference being had to the accompanying drawings.

This invention relates to gauges which are used by machinists and others for verifying angles or squaring surfaces.

A tool of this character is useful for enabling one surface to be made accurately at a right angle to another, or two surfaces to be complementary to each other, or for determining to a fine degree of accuracy the error between two machined surfaces.

In forming objects wherein two surfaces are to be at right angles to each other, it is usually difficult to accurately gauge the surfaces, due to the personal error incident to the use of a tool gauge. One of the objects of my invention, therefore, is the provision of a gauge which indicates a divergence double the error between two surfaces which are to be formed at right angles to each other, thus enabling the operator to diminish the error by at least one-half over that which is ascertainable with the customary non-adjustable square. An advantage of this gauge is, that the double error may be quickly and accurately ascertained without previously setting the gauge to any predetermined mark on the gauge block.

The above result is accomplished by constructing a gauge having a block which pivotally supports a blade at one end thereof. This blade is provided with means for enabling it to be locked against pivotal movement and an adjusting mechanism associated with the support is utilized for obtaining a fine degree of adjustment. The blade may be moved longitudinally of itself in the support therefor, before or after the support is clamped.

The means for carrying out my invention will be more fully set forth in the following description, which pertains to the drawings, and the essential features will be summarized in the claims.

Figure 1:
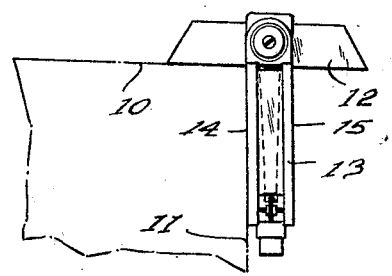
Figure 2:
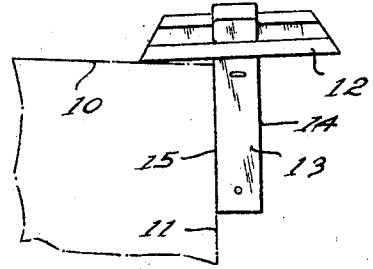
Figure 3:
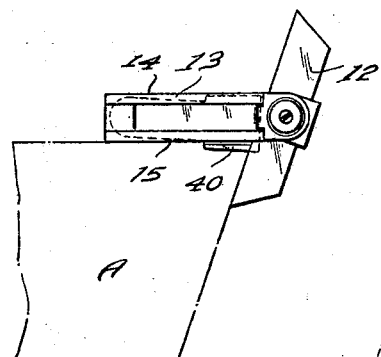
Figure 4:
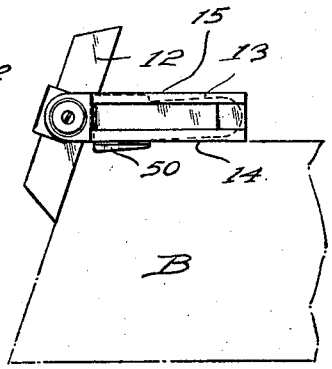
Figure 5:
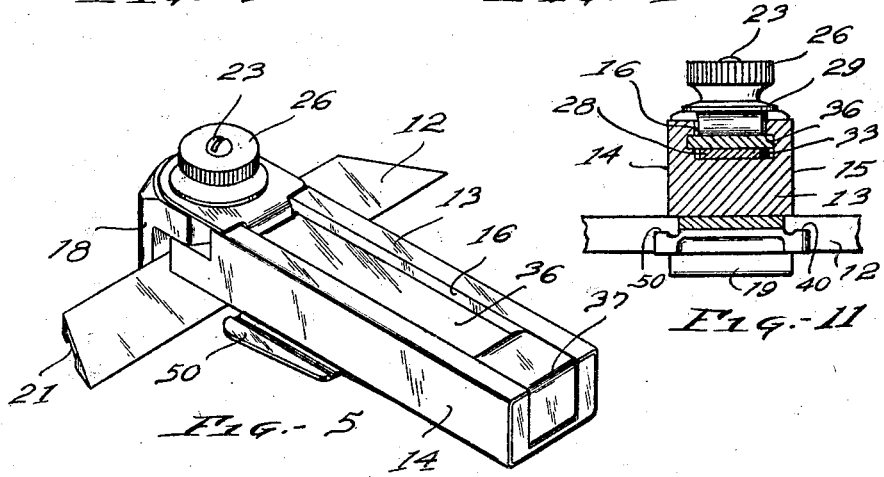
Figure 11:
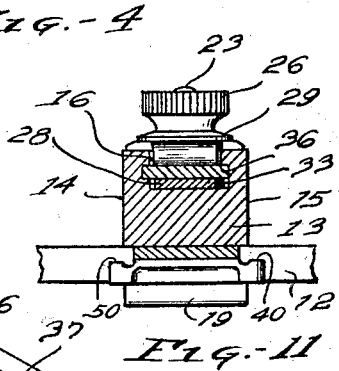

In the drawings, Fig. 1 is a front elevation of a gauge constructed according to my invention and showing the use thereof for measuring two surfaces which are substantially at right angles to each other; Fig. 2 is a similar view with the gauge reversed to indicate the error between the surfaces measured; Figs. 3 and 4 are elevations of the gauge indicating the use for measuring complementary surfaces; Fig. 5 is a perspective view of a gauge constructed according to my invention; Fig. 6 is a rear elevation of the gauge; Fig. 7 is a side elevation thereof; Fig. 8 is a front elevation of the gauge showing the pivotal thumb piece; Figs. 9 and 10 are sections taken on the lines 9—9 and 10—10 in Figs. 6 and 7 respectively, and Fig. 11 is a transverse section taken on the line 11—11 in Fig. 6 through the tool block.

My invention is particularly useful in ascertaining the variation between two surfaces at right angles to each other. Accordingly, in Figs. 1 and 2, I have shown surfaces diagrammatically at 10 and 11 with the gauge in reverse position in the one figure to indicate the degree by which the two surfaces differ from a right angle. This difference is detected by angular deviation between the blade 12 and surface 10 when the block 13 is reversed with reference to the object, as shown in Figs. 1 and 2, respectively. The blade is adapted to be pivotally mounted on the block and to be adjustable relatively thereto, as will be hereinafter described.

The block 13 comprises a member having surfaces 14 and 15 which are absolutely parallel to each other and having a longitudinally recessed portion 16 on the rearward side thereof. At one end of the block, this recess is cut inwardly, as at 17, (see Fig. 7) to provide for an adjusting mechanism which will be hereinafter described, and at the other end, provision is made for receiving a carrier 18 which carries a blade 12.

The carrier is shown as a U-shaped member having the intermediate portion thereof straddling the top of the block and having the ends thereof disposed on opposite sides of the block. The forward end 19 may be provided with a guide 20 which engages a corresponding way 21 in one face of the blade. A suitable set screw 22 may then be used for retaining the blade in adjustable position relative to the carrier. The other end of the carrier is pivoted on a threaded pin 23, the inner end of which may be shaped to engage an angular recess 24 in the rear of the block. Both the blade and carrier are prevented from binding against the block by reason of the fact that a jamb nut 25 is threaded onto the member 23 and brought tightly against the back of the carrier, thus making the carrier 18, screw 23, and nut 25 substantially one integral piece.

The carrier is restrained in its pivotal movement by a binding nut 26 which clamps it to the outer end 27 of an adjusting bar 28 which straddles the jamb nut and extends substantially the entire length of the recess 16 and terminates adjacent the tapered portion 17 of the recess. A washer 29 extends between the bar and nut 26 to prevent the binding nut from engaging the jamb nut when clamped in position. In this way the blade may be clamped against pivotal movement and still be free for movement longitudinally of itself.

To attain a fine degree of adjustment, I have shown the lower end of the bar 28 slotted, as at 30, to receive a wheel 31 which is in threaded engagement with the screw 32. This screw extends across the recess 16 and is supported by the opposite walls of the block, as shown particularly in Fig. 10. A leaf spring 33 may be employed for urging the bar in engagement with one face of the wheel, thus preventing backlash while adjustment is being made. When the binding nut 26 is loosened, the movement of the carrier may be limited by a pin 34 which projects through an arcuate slot 35 in the outer end of the bar 28. The bar and adjusting mechanism may be protected by a plate 36 which slides in suitable ways within the block, and by a hinged cover 37, which may be folded over the adjusting wheel 31.

In using the gauge, particularly for gauging two surfaces which are to be complementary, the bearing surfaces 14 or 15 may be maintained in the same plane for readings in both positions of the gauge by employing an additional bearing surface, as at 40, which engages the forward face of the object. This surface is preferably part of a thumb piece 41 which is pivoted at 42 and is provided with a pin 43 which engages a slot 44 in the block to limit the degree of lateral movement. This extent of movement is just sufficient to enable the sides of the thumb piece to clear the sides 14 or 15 when shifted to one side or the other, whereby the gauge may be satisfactorily used without employing the thumb piece. Another surface 50 corresponding to that indicated at 40 is on the side of the thumb piece adjacent the face 14.

The two positions of the thumb piece are indicated in Figs. 5 and 6, wherein the surface 50 projects beyond the surface 14 in Fig. 5, and the surface 40 beyond the face 15 in Fig. 6. In Fig. 8, the position of the thumb piece, indicated in Fig. 6, is shown in full lines, while the position, indicated in Fig. 5, is shown in broken lines. The use of this thumb piece is shown in Figs. 3 and 4 as engaging the rearward and forward faces respectively of the objects A and B. This thumb piece is particularly useful for holding the block strictly at right angles to the surface to be gauged; thus insuring positioning with respect to two similar surfaces.

In gauging surfaces substantially at right angles to each other for determining the degree of error therein, the gauge is placed so that one face, as at 14, engages a surface of the object, as at 11, and the blade is then turned on its pivot until the edge thereof engages another surface 10. Then the blade is clamped by turning the binding nut 26, and a final adjustment is obtained by turning the adjusting wheel 31. As soon as the operator is satisfied that the blade and bearing surface 14 are in close fitting engagement with the object, then the gauge is reversed so that the bearing surface 15 is brought into engagement with the surface 11, as shown in Fig. 2. In this position, the former overhanging portion of the blade is brought into contact with the surface 10, thus indicating, as shown in Fig. 2, the degree with which the surfaces 10 and 11 may vary from a right angle.

If it is desired to form one object complementary to another, as indicated at A and B, then the gauge may be quickly set for one angle, as shown in Fig. 3 and subsequently reversed to obtain the complementary angle, as shown in Fig. 4.

From the foregoing description, it will be seen that a gauge constructed according to my invention, enables one to quickly ascertain the error in complementary surfaces without previously setting the blade to any predetermined mark. In this way, the operator may work to a much finer degree of accuracy, particularly in forming dies, since the error between the surfaces is indicated as double that actually existing. A tool of this character requires comparatively few parts and may be cheaply manufactured. In addition, the tool retains its accuracy after a long period of use.

Having thus described my invention, I claim:

1. A tool gauge comprising in combination, a block, a carrier having portions extending on opposite sides of the block, a blade disposed intermediate the block and one of said portions and carried by said carrier, means for locking the blade to the carrier independently of the block, said carrier being pivoted to the block on the side opposite the blade, a lever fulcrumed on the same pivot as the carrier and having the free end thereof extending lengthwise of the block, means engaging the free end of the lever for causing lateral displacement thereof, and means for locking the lever and carrier to the block.

2. A tool gauge comprising in combination, a block, a carrier comprising a U-shaped member straddling the end of the block, a blade mounted in said carrier, means for locking the blade to the carrier independently of the block, the carrier being pivotally mounted on the block, a lever fulcrumed on the pivotal connection for the carrier, means for locking it to the carrier, said lever extending longitudinally of the block and having the free end thereof adjacent the end opposite the carrier, and a rotatable member carried by said block and engaging said lever for causing pivotal displacement thereof.

3. A tool gauge comprising in combination a block having a longitudinally extending recess in one face thereof, a blade associated with the block, a carrier comprising a yoke pivotally supported on the block, said blade being mounted on the carrier adjacent the side of the block opposite the pivotal connection of the carrier, a member lying within said recess and pivoted on the same pivotal connection for the carrier, and means for clamping the carrier to said member.

4. A tool gauge, comprising in combination, a block, a blade associated therewith, a blade carrier comprising a member straddling the end of the block and pivotally connected at one side thereto; means for locking the blade to the carrier independently of the block; a member also pivoted to the block on the same axis on which the carrier is pivoted, means for clamping the carrier to said member, and a wheel movably transversely of the member for swinging the free end of said member laterally, whereby the carrier may move about the pivot therefor after it is clamped to said member.

5. A tool gauge comprising in combination, a block, a blade associated with the block, a blade carrier mounted on the end portion of the block and pivotally connected thereto, means for enabling the blade to be slid lengthwise on the carrier, a member extending lengthwise of the block, said member having a portion thereof in abutting engagement with the carrier, means for clamping the member and carrier together, a threaded shaft supported by the block and extending transversely of the member, and a cooperably threaded thumb wheel movable along said shaft and engaging the free end of the member, whereby the carrier may be swung about the pivotal connection therefor after it is clamped to said member.

6. A tool gauge, comprising in combination, a block having a longitudinally extending recess along one side thereof, a blade associated with the block, a carrier attached to the blade and straddling the end of the block, and pivotally connected thereto on the side having the recess, a member extending substantially the entire length of the block and lying within the recess, said member having a portion thereof in abutting engagement with the carrier, means adjacent the pivotal connection for clamping the member and carrier together, and other means associated with the free end of said member whereby the carrier may be swung about the pivotal connection therefor after it is clamped to said member.

7. A tool gauge comprising in combination, a block, a blade associated with the block, a carrier attached to said blade, a member lying lengthwise of the block, means for pivotally supporting the member and carrier on the block and about the same pivot point, means for clamping the member and carrier together whereby the blade is held against pivotal movement relatively to said member, a wheel mounted in the block and adapted to travel laterally consequent upon its rotation and engaging said member, whereby rotation of the wheel swings the carrier and blade about the pivot point thereof after the member and carrier are clamped together.

8. A tool gauge comprising in combination, a block having a recess therein, a blade associated with the block, a carrier attached to said blade, a member lying partially within said recess, means for pivotally supporting the member and carrier on the block about the same pivot point, and means for clamping the member and carrier together whereby the blade is held against pivotal movement relatively to said member, a threaded shaft carried by the block and extending transversely of the recess beyond the end of said member, a wheel threaded on the shaft, and yieldable means for holding said member in engagement with said wheel, whereby rotation of the wheel swings the carrier and blade about the pivot point thereof after the member and carrier are clamped together.

9. A tool gauge comprising in combination, a block, a blade associated therewith, a threaded member having one end thereof in frictional engagement with one side of the block, a carrier attached to the blade and threaded on said member, a jamb nut on said threaded member for locking the carrier and member together, a lever having one end thereof straddling the nut and the other end thereof extending along the block, means for clamping the lever and carrier together whereby the blade is held against pivotal movement relatively to the lever without being clamped to the block, and mechanism adjacent the free end of the lever and associated therewith and with said block for swinging the carrier about the pivot point thereof, while the lever and carrier are clamped together.

10. A tool gauge comprising in combination, a block having a longitudinally extending recess along one face thereof, a blade associated with the block and adapted to be mounted adjacent the opposite face thereof, a carrier attached to the blade and comprising a U-shaped member having the intermediate portion thereof straddling the end of the block, a member threaded through one end of said carrier and abutting the block, a nut threaded on said member for locking the carrier thereto, a lever straddling said nut and having a portion thereof engaging the carrier, said lever extending along the block within the recess, means for clamping the lever to the carrier, other means for swinging the lever about the axis of said threaded member, said last mentioned means comprising a screw and nut couple, one member of which is carried by the block and engages the end of the lever adjacent the free end thereof, and a spring engaging the block for holding the lever in engagement with said member of the screw and nut couple, said couple being adapted to swing the carrier after it is clamped to said lever.

11. A tool gauge comprising in combination, a block, a blade associated with the block, a carrier attached to the blade and pivotally supported on the block, a lever pivoted at the same pivotal connection as the carrier, means for clamping the carrier and lever together, and other means for swinging the lever after it is clamped to the carrier.

12. In a gauge, the combination of a tool block having a pair of parallel surfaces, a thumb piece comprising a member pivoted to the block and adapted to swing to either side thereof, and means for limiting the movement of the thumb piece so that when one edge of the free end thereof overhangs one of said surfaces the opposite edge is positioned over the block.

13. In a gauge, the combination with a block having a pair of parallel work-engaging surfaces, a thumb piece pivoted adjacent one end of the block on an axis parallel to said surfaces and movable in a plane normal thereto, the free end of the thumb piece being wider than the distance between the parallel surfaces, and a pin and slot connection between the block and thumb piece for permitting transverse movement of the thumb piece so that either edge thereof may project beyond one of said surfaces while the other edge is disposed over the block.

In testimony whereof, I hereunto affix my signature.

WILLIAM JOHN DEMMING.